United States Patent
Brody

(10) Patent No.: US 12,465,255 B1
(45) Date of Patent: Nov. 11, 2025

(54) METHOD AND SYSTEM FOR DERIVING A PRESSURE FLOW STUDY SCORE AND COMPONENTS THEREOF

(71) Applicant: SRS Medical Systems, LLC, North Billerica, MA (US)

(72) Inventor: Lee Brody, Somerville, MA (US)

(73) Assignee: SRS Medical Systems, LLC, Chelmsford, MA (US)

( * ) Notice: Subject to any disclaimer, the term of this patent is extended or adjusted under 35 U.S.C. 154(b) by 861 days.

(21) Appl. No.: 17/695,942

(22) Filed: Mar. 16, 2022

Related U.S. Application Data

(60) Provisional application No. 63/162,084, filed on Mar. 17, 2021.

(51) Int. Cl.
*A61B 5/20* (2006.01)
*A61B 5/00* (2006.01)
*A61B 5/391* (2021.01)

(52) U.S. Cl.
CPC .............. *A61B 5/208* (2013.01); *A61B 5/391* (2021.01); *A61B 5/7475* (2013.01)

(58) Field of Classification Search
CPC ........ A61B 5/208; A61B 5/391; A61B 5/7475
See application file for complete search history.

(56) References Cited

U.S. PATENT DOCUMENTS

| | | | | |
|---|---|---|---|---|
| 6,719,709 B2* | 4/2004 | Whalen | ................... | A61B 5/208 600/587 |
| 7,147,606 B1* | 12/2006 | Chang | .................... | A61B 5/036 600/561 |
| 7,522,061 B2* | 4/2009 | Rondoni | ............... | A61B 5/0002 604/362 |
| 7,833,142 B2* | 11/2010 | Karp | ................... | A63B 23/0233 482/23 |
| 8,597,184 B2* | 12/2013 | Addington | ........... | A61B 5/7475 600/561 |
| 9,101,314 B2* | 8/2015 | Shi | ......................... | A61B 5/205 |
| 11,207,012 B2* | 12/2021 | Belotserkovsky | ..... | A61B 5/202 |
| 11,224,719 B2 | 1/2022 | Brody | | |
| 12,295,732 B2* | 5/2025 | Beer | ...................... | A61B 5/205 |
| 12,337,173 B2* | 6/2025 | Potts | .................... | A61N 1/0514 |
| 2006/0122488 A1* | 6/2006 | Kajbafzadeh | .......... | A61B 5/205 600/561 |

(Continued)

OTHER PUBLICATIONS

Kaplan et al., "Noninvasive Pressure Flow Studies in the Evaluation of Men with Lower Urinary Tract Symptoms Secondary to Benign Prostatic Hyperplasia: A Review of 50,000 Patients," The Journal of Urology, vol. 204, 1296-1304, Dec. 2020.

*Primary Examiner* — Jeffrey G. Hoekstra
(74) *Attorney, Agent, or Firm* — Dicke, Billig & Czaja, PLLC

(57) ABSTRACT

A method of assessing pressure flow study data is provided. The method is characterized by obtaining a select weighted average composite of select derived symptom sub-scores via use of a urodynamic system characterized by, in operative combination, a processor, memory and symptom score software executable by the processor, the urodynamic system receiving input from at least pressure and urine flow sensing devices. A flow rate efficiency sub-score is derived, along with a voided urine volume sub-score, a post void residual sub-score, a flow pattern sub-score and a pressure pattern sub-score.

9 Claims, 18 Drawing Sheets

(56) References Cited

U.S. PATENT DOCUMENTS

| | | | |
|---|---|---|---|
| 2006/0276712 A1* | 12/2006 | Stothers | A61B 5/14546 600/438 |
| 2007/0225616 A1* | 9/2007 | Brown | A61B 5/202 600/587 |
| 2008/0262389 A1* | 10/2008 | Shahar | A61B 5/4381 600/586 |
| 2008/0300649 A1* | 12/2008 | Gerber | A61B 5/205 600/586 |
| 2010/0152684 A1* | 6/2010 | Kim | A61B 5/4381 604/318 |
| 2014/0107432 A1* | 4/2014 | Bastia | A61B 5/202 600/300 |
| 2014/0228654 A1* | 8/2014 | Kim | A61B 5/053 600/561 |
| 2014/0316219 A1* | 10/2014 | Paz | A61B 5/7282 600/584 |
| 2014/0330546 A1* | 11/2014 | Deng | G16H 50/50 703/2 |
| 2017/0055874 A1* | 3/2017 | Papirov | A61B 5/07 |
| 2018/0214122 A1* | 8/2018 | Ansell | G16H 50/20 |
| 2019/0008439 A1* | 1/2019 | Sageder | A61B 5/742 |
| 2019/0046101 A1* | 2/2019 | Tsukada | A61B 5/6874 |
| 2019/0110733 A1* | 4/2019 | Pop | A61B 5/7278 |
| 2019/0246937 A1* | 8/2019 | Chow | A61B 5/296 |
| 2020/0268302 A1* | 8/2020 | Oh | A61B 5/227 |
| 2021/0186399 A1* | 6/2021 | Gunderson | A61B 5/1116 |

\* cited by examiner

| PVR | PVR Value Sub-Score |
|---|---|
| < 50 ml | 1 (which is 100%) |
| 50 ≤ PVR < 100 ml | 1 - (PVR-50)*0.006 |
| 100 ≤ PVR < 150 ml | .7 - (PVR-100)*0.006 |
| 150 ≤ PVR < 200 ml | .4 - (PVR-150)*0.004 |
| 200 ≤ PVR < 300 ml | .2 - (PVR-200)*0.001 |
| 300 ≤ PVR < 400 ml | .1 - (PVR-300)*0.001 |
| PVR ≥ 400 ml | 0 |

FIG. 7

| PVR%BC | PVR%BC Value Sub-Score |
|---|---|
| < .1 | 1 |
| .1 ≤ PVR%BC < .2 | 1 - (PVR%BC-.1)*1 |
| .2 ≤ PVR%BC < .4 | .9 - (PVR%BC-.2)*1.5 |
| .4 ≤ PVR%BC < .5 | .6 - (PVR%BC-.4)*2 |
| .5 ≤ PVR%BC < .8 | .4 - (PVR%BC-.5)*1 |
| .8 ≤ PVR%BC < 1 | .1 - (PVR%BC-.8)*0.5 |
| PVR%BC = 1 | 0 |

Where PVR%BC = (PVR / {PVR+VV})

FIG. 8

| VV | VV Value Sub-Score |
|---|---|
| < 25 ml | .05 |
| 25 ≤ VV < 50 ml | .05 + (VV-25)*0.002 |
| 50 ≤ VV < 100 ml | .1 + (VV-50)*0.003 |
| 100 ≤ VV < 200 ml | .25 + (VV-100)*0.005 |
| 200 ≤ VV < 300 ml | .75 + (VV-200)*0.0025 |
| 300 ≤ VV < 500 ml | 1 |
| 500 ≤ VV < 600 ml | 1 - (VV-500)*0.0025 |
| 600 ≤ VV < 800 ml | .75 - (VV-600)*0.001 |
| 800 ≤ VV < 900 ml | .55 - (VV-800)*0.0015 |
| 900 ≤ VV < 1300 ml | .4 - (VV-900)*0.001 |
| VV ≥ 1300 | 0 |

FIG. 9

| Void Time (seconds) | Void Time Sub-Score |
|---|---|
| < 4 s | 0 |
| 4 ≤ VT < 10 s | 0 + (VT-4)*0.08333 |
| 10 ≤ VT < 20 s | .5 + (VT-10)*0.05 |
| 20 ≤ VT < 30 s | 1 |
| 30 ≤ VT < 40 s | 1 - (VT-30)*0.035 |
| 40 ≤ VV < 50 s | .65 - (VT-40)*0.025 |
| 50 ≤ VV < 60 s | .4 - (VT-50)*0.04 |
| VT ≥ 60 s | 0 |

FIG. 10

| Hesitancy (seconds) | Hesitancy Sub-Score |
|---|---|
| 0 < H < 5 s | 1 - (H)*0.2 |
| H ≥ 5 s | 0 |

FIG. 11

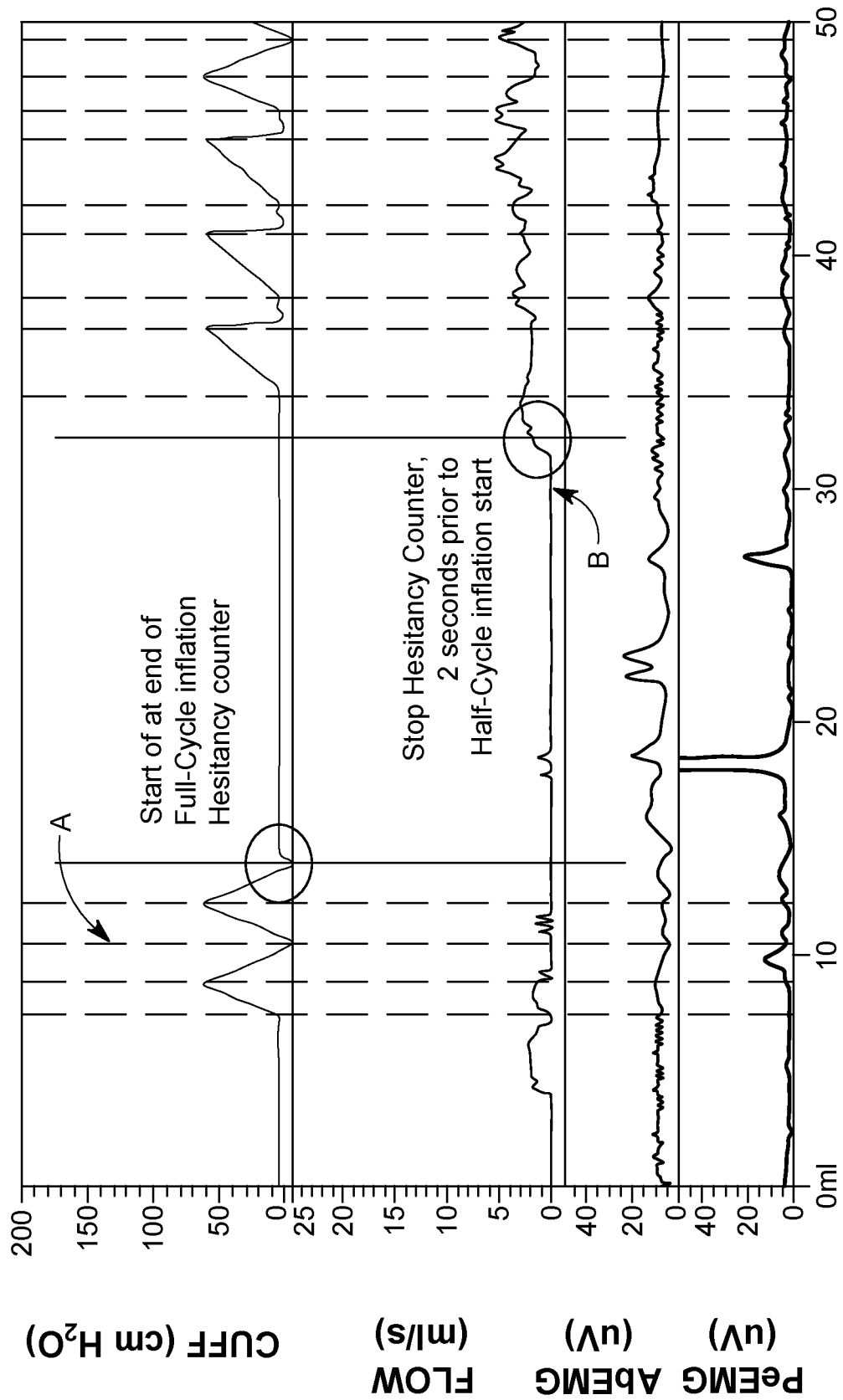
FIG. 11A.I

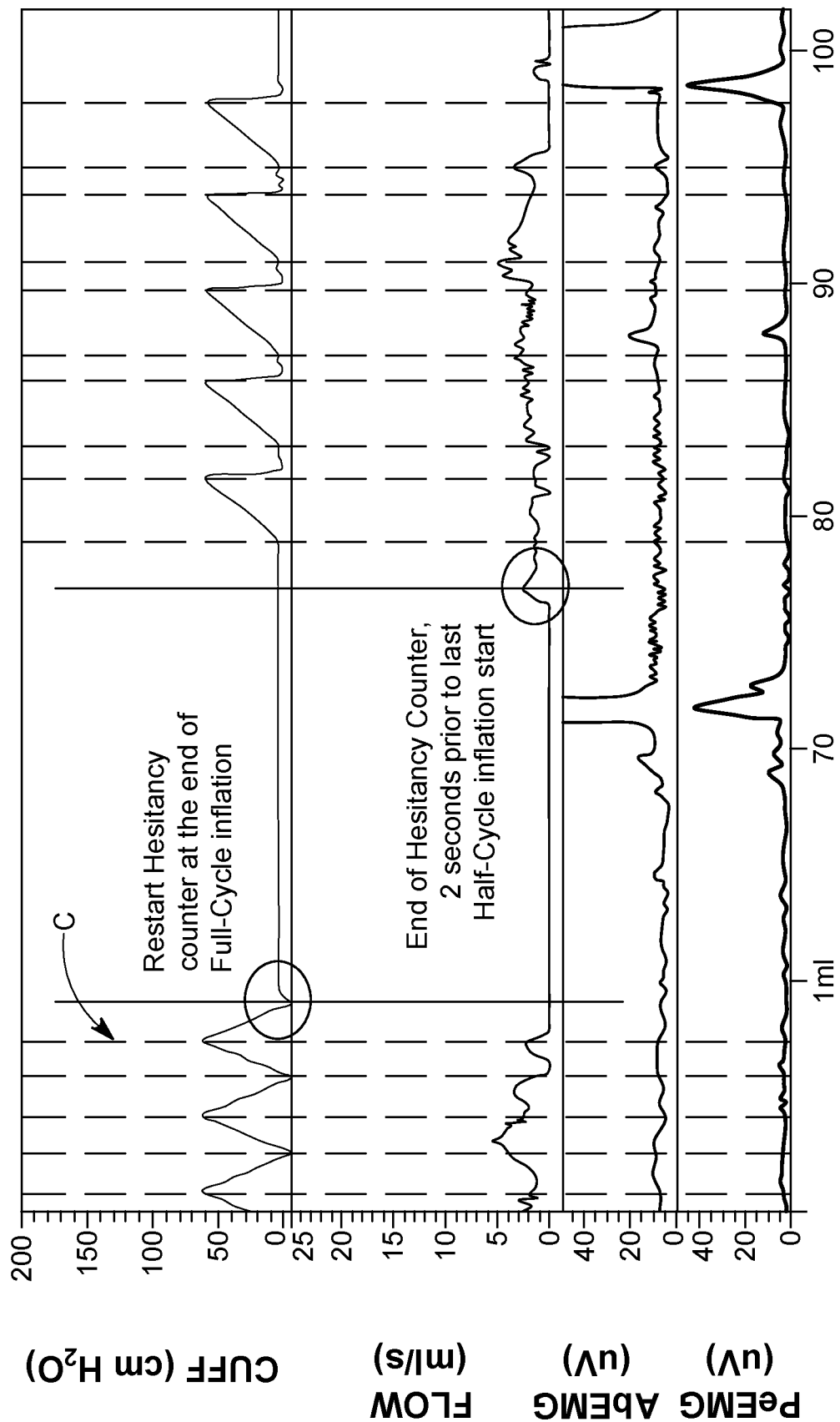
FIG. 11A.II

| Time to Peak (%) | Time to Peak Sub-Score |
|---|---|
| TP < 0.2 | 1 |
| 0.2 ≤ TP < 0.3 | 1 - (TP-0.2)*2 |
| 0.3 ≤ TP < 1.0 | 0.8 - (TP-0.3)*1 |
| TP ≥ 1.0 | 0.1 |

FIG. 12

| Peak Flow (ml/s) | Peak Flow Sub-Score |
|---|---|
| < 1 ml/s | 0 |
| 1 ≤ PF < 3 ml/s | 0 + (PF-1)*0.05 |
| 3 ≤ PF < 5 ml/s | 0.1 + (PF-3)*0.1 |
| 5 ≤ PF < 10 ml/s | 0.3 + (PF-5)*0.09 |
| 10 ≤ PF < 15 ml/s | 0.75 + (PF-10)*0.05 |
| 15 ≤ PF < 20 ml/s | 1 |
| 20 ≤ PF < 40 ml/s | 1 - (PF-20)*0.05 |
| PF ≥ 40 ml/s | 0 |

FIG. 13

| STDEV/AverageFRE | PFMatch Sub-Score |
|---|---|
| 0 | Do not use sub-score |
| 0 < STDEV/AverageFRE < 0.1 | 1 |
| 0.1 < STDEV/AverageFRE < 0.35 | 1 - (STDEV-.1)*1.8 |
| 0.35 < STDEV/AverageFRE < 0.8 | .55 - (STDEV-.35)*1 |
| STDEV/AverageFRE $\geq$ 0.8 | 0.1 |

FIG. 14

| Peak Pressure (cmH$_2$O) | Peak Flow Sub-Score |
|---|---|
| < 15 cmH$_2$O | 0 |
| 15 $\leq$ PP < 40 cmH$_2$O | 0 + (PP-15)*0.01 |
| 40 $\leq$ PP < 60 cmH$_2$O | 0.25 + (PP-40)*0.0125 |
| 60 $\leq$ PP < 80 cmH$_2$O | 0.5 + (PP-60)*0.025 |
| 80 $\leq$ PP < 120 cmH$_2$O | 1 |
| 120 $\leq$ PP < 160 cmH$_2$O | 1 - (PP-120)*0.01 |
| 160 $\leq$ PP < 200 cmH$_2$O | 0.6 - (PP-160)*0.01 |
| PP $\geq$ 200 cmH$_2$O | 0.2 |

FIG. 15

| Max - Min (uV) | MaxMin Sub-Score |
|---|---|
| < 2 uV | 1 |
| 2 ≤ MM < 4 uV | 1 - (MM-2)*0.05 |
| 4 ≤ MM < 12 uV | 0.9 - (MM-4)*0.1 |
| MM ≥ 12 uV | 0.1 |

FIG. 16

| Mean - Min (uV) | MeanMin Sub-Score |
|---|---|
| < 1 uV | 1 |
| 1 ≤ AM < 2 uV | 1 - (AM-1)*0.05 |
| 4 ≤ AM < 11 uV | 0.95 - (AM-2)*0.1 |
| AM ≥ 11 uV | 0.05 |

FIG. 17

METHOD AND SYSTEM FOR DERIVING A PRESSURE FLOW STUDY SCORE AND COMPONENTS THEREOF

This is a United States patent application filed pursuant to 35 USC § 111 (a) claiming priority under 35 U.S.C. § 120 to U.S. Pat. Appl. Ser. No. 63/162,084 filed Mar. 17, 2021 pursuant to 35 U.S.C. § 111 (b) and entitled PFS SCORE FOR VOIDING PRESSURE STUDIES, said application incorporated herein by reference in its entirety.

TECHNICAL FIELD

The present disclosure is generally directed to pressure flow studies (PFS) in furtherance of assessing patients with lower urinary tract symptoms (LUTS), more particularly, in addition to a present peak pressure and peak flow assessment focus or emphasis, a heretofore unseen symptom assessment paradigm is provided, namely, a paradigm characterized by a validated symptom score methodology utilizing and leveraging several channels of pressure flow study output data, with a system for deriving the pressure flow study system score and score per se likewise contemplated.

BACKGROUND

Urologists and other medical professionals perform voiding pressure flow studies (PFS) as a diagnostic for patients with lower urinary tract symptoms (LUTS). A PFS is the diagnostic gold-standard for determining the relationship between pressures generated by the body and the urine output/discharge flow rate. The 2018 version of the American Urological Association (AUA) Guidelines on benign prostatic hyperplasia (BPH) called for expanded use of PFS as a diagnostic owing to an enhanced understanding of bladder function and bladder outlet obstruction (BOO).

By simultaneously determining the pressures generated by the body during voiding, and the resulting urine output flow rate, a healthcare provider (e.g., and typically, a urologist) can also deduce an amount of outlet resistance at the bladder neck and urethra. This information can combine to inform the provider as to the potential source(s) of LUTS, and the likelihood that certain interventions will be successful. For instance, and without limitation, if it is determined that a patient generates high pressures with a low urine output flow, he is deduced to have high outlet resistance and a procedure to lower the outlet resistance may be considered. There are two types of PFS studies (i.e., data acquisition approaches), catheterized and non-invasive.

Catheterized PFS involve the simultaneous measurement of three physiologic parameters, namely, bladder (vesical) pressure, abdominal cavity pressure, and urine discharge flow rate. Towards this end, the following exemplary steps are generally undertaken: (a) a measurement catheter is placed in the bladder for continuous measurement of the vesical pressure within the bladder; (b) a measurement catheter is placed in the abdominal cavity for continuous measurement of abdominal pressure; and, (c) the voided volume of urine/urine discharge is continuously weighed so that urine flow rate can be continuously derived.

Non-invasive PFS seek indirect determination of select physiologic parameters, or proxies for same. Towards this end, the following exemplary steps are generally undertaken: (a) during the void, a series of counter pressures are applied to the urine discharge stream with the effects thereupon monitored so as to estimate and assess vesical pressure; (b) via the application of electromyography (EMG) electrodes to the abdomen, an optional measurement of abdominal EMG throughout the void can provide an estimate of abdominal straining; and, (c) the voided volume of urine/urine discharge is continuously weighed so that urine flow rate can be continuously derived.

Known, illustrative non-invasive approaches are exemplified by SRS Medical Systems, Inc., Massachusetts, USA, part-and-parcel of their UroCuff/UroCuff DC Test performed on their CT3000Plus or CT3000Pro Complete Urodynamics Systems/Instruments. Either of a penile cuff (UroCuff Classic) or a direct compression device (UroCuff DC, see e.g., Applicant's U.S. Pat. No. 11,224,719B2) may be selectively and suitably utilized in the performance of the UroCuff Test. Moreover, and optionally, surface electromyography (EMG) electrodes may be attached to either or both of the perineum and abdomen to detect detrusor-sphincter dyssynergia and abdominal straining respectively. Finally, by way of further background, reference to the work of Kaplan, Kohler, and Kausik is noteworthy, namely, *"Non-invasive Pressure Flow Studies in the Evaluation of Men with Lower Urinary Tract Symptoms Secondary to Benign Prostatic Hyperplasia: A Review of 50,000 Patients,"* The Journal of Urology, vol. 204, 1296-134 December 2020, that work incorporated herein by reference in its entirety.

As is well known, the body generates pressure to force urine out of the body from two sources: (a) the primary source should be a coordinated contraction of the bladder wall (i.e., detrusor muscle), and (b) some patients "bare down" and voluntarily produce an abdominal contraction. The measurement catheter in the bladder, or the changes in flow during pressures applied with non-invasive PFS, cannot differentiate the pressure generated by the detrusor muscle from that generated by the abdomen contraction. In order to isolate the pressure generated by the detrusor, the abdominal pressure must be subtracted from the vesical pressure.

An illustrative graphic, FIG. 1, shows an example of pressures generated during a void (i.e., pressure as a function of void time/duration) in a catheterized PFS context. The top graph is the output of the pressure sensor in the bladder (Pves—vesical pressure), the middle graph is the output of the pressure sensor in the abdominal cavity (Pabd—abdominal pressure) and the bottom graph is the calculated difference (Pves–Pabd), which is the amount of pressure generated by the bladder walls contracting (Pdet—detrusor pressure). The FIG. 1 graphs indicates a patient who is generating substantial pressure during a void, however, nearly all of the pressure generated is coming from an abdominal contraction.

A further illustrative graphic, FIG. 2, shows parameter values during a void in a non-invasive PFS. From top to bottom, the graphic represents applied pressure (i.e., cuff pressure), urine discharge flow rate, and measured abdominal EMG values.

Traditionally, the primary diagnostic information gathered during a PFS is presented on a validated nomogram, see e.g., either of FIG. 3 or FIG. 4. The data is limited to plotting a maximum recorded pressure on the y-axis and a maximum recorded flow rate on the x-axis.

The nomograms are characterized by multiple regions. Common to the catheterized PFS nomogram (FIG. 3; International Continence Society (ICS) Nomogram)) and the non-invasive PFS nomogram (FIG. 4; Newcastle Noninvasive Nomogram)) are two regions, namely, (a) "obstructed," where the pressure value is (too) high for its associated flow value and it is thusly deduced that there is (high) resistance in the form of a urethral obstruction, and (b) "unobstructed," where the amount of flow generated for its associated pressure indicates that there is low resistance. Unique regions for the nomograms of each PFS type are taken up hereinafter.

For catheterized PFS, a further region is delimited. More particularly, an equivocal region wherein it is unclear whether the patient is obstructed or unobstructed.

For non-invasive PFS, two further regions are delimited. More particularly, low pressure-low flow wherein the patient has both low pressure and low flow, and high pressure-high flow wherein the patient has both high pressure and high flow.

While there is no denying the important diagnostic contribution of PFS for the management of patients presenting with LUTS, it is believed that a more particularized (supplemental) assessment or metric is obtainable via a robust appreciation of, among other things, PFS parameters, including but not limited to monitored and/or sensed PFS variables/inputs, and/or identification and utilization of relationships premised upon data commonly acquired and/or encountered in PFS performance. While nomogram use tells a story, a story predicated on maximum pressure and maximum urine discharge flow values, it is believed that other readily attainable values and/or ascertainable relationships or parameters may be identified and fabricated for the sake of a new metric to tell a more robust diagnostic story as individuals exhibiting identical pressure and flow maximums may in fact not be similarly situated with regard to management.

SUMMARY OF THE INVENTION

A symptom score derivation methodology is notionally provided, a symptom score augmenting findings of a pressure flow study (PFS) for lower urinary tract symptom determination wherein voiding pressure and resulting urine flow rate determinations are obtained in furtherance of ascertaining a maximum urine discharge flow rate, a maximum pressure value, and a total volume of voided urine. The symptom score is characterized by a select weighted average composite of select symptom sub-scores. A flow rate efficiency sub-score is derived, the flow rate efficiency sub-score having origins in the nomogramic flow rate efficiency determination. A voided urine volume sub-score is derived, the voided urine volume subscore having origins in the total volume of voided urine. A flow pattern sub-score is derived, the flow pattern sub-score reflective of plural components. A pressure pattern sub-score is derived, the pressure pattern sub-score reflective of plural components. Select combining of select sub-scores yields the symptom score comprising select weighted average composite of select symptom sub-scores.

A symptom score to augment findings of a PFS for LUTS determination, wherein voiding pressure and resulting urine flow rate determinations are obtained in furtherance of ascertaining a maximum urine flow rate, a maximum pressure value, and a total volume of voided urine, is likewise contemplated. The symptom score supplements nomogramic flow rate efficiency determination. The symptom score comprises a select weighted average composite of select symptom sub-scores. Advantageous, non-limiting symptom sub-scores include a flow rate efficiency sub-score having origins in the nomogramic flow rate efficiency determination, a voided urine volume sub-score having origins in the total volume of voided urine, a post void residual sub-score reflective of plural components, a flow pattern sub-score reflective of plural components, and, a pressure pattern sub-score, reflective of plural components.

Finally, a urodynamic system (UDS) for deriving a symptom score to augment findings associated with a pressure flow study for lower urinary tract symptom determination is contemplated and provided. The UDS is notionally characterized by a processor for processing select urodynamic patient parameter inputs, memory/a database accessible by the processor, user input/output devices operably linked to the processor in furtherance of supporting processor control and/or display of patient parameter inputs/select processed urodynamic patient parameter inputs, and a symptom score derivation module operably linked/linkable with the processor and database. The symptom score derivation module executes steps of deriving select symptom sub-scores characterized by two or more of a flow rate efficiency sub-score, a voided urine volume sub-score, a flow pattern sub-score, and a pressure pattern sub-score, the symptom score comprising a select weighted average composite of select symptom sub-scores. More specific features and advantages obtained in view of the summarized features will become apparent with reference to the drawing figures and DETAILED DESCRIPTION OF THE INVENTION.

BRIEF DESCRIPTION OF THE DRAWINGS

All figures have been prepared, and are included to facilitate and/or enhance an understanding of the basic teachings of the contemplated embodiments, and/or the concepts underlying same, and are incorporated in and constitute a part of this specification. While the drawings illustrate embodiments and context with respect thereto, and together with the description serve to explain principles of embodiments, other embodiments and many of the intended advantages of the disclosed systems, subsystems, assemblies, subassemblies, apparatus, devices, mechanisms, methods, rubrics, protocols, etc. will be readily appreciated as they become better understood by reference to the following detailed description and figures. It is to be noted, as circumstances warrant, that the elements of the drawings are not necessarily to scale relative to each other, with like reference numerals designating corresponding similar parts/structures.

FIGS. 1-21 are provided herewith wherein:

FIG. 1 illustratively depicts select relationships part-and-parcel of performance of a catheterized PFS, more particularly, measured pressure component values as a function of subject void time, namely, top to bottom, vesical, abdominal, and detrusor pressure component values;

FIG. 2 illustratively depicts select relationships part-and-parcel of performance of a non-catheterized PFS (e.g., UroCuff Test), more particularly, top to bottom, applied pressure, urine discharge flow, and abdominal electromyography (EMG) values as a function of subject void time;

FIG. 3 depicts a representative nomogram part-and-parcel of performance of a catheterized PFS, namely, an International Continence Society (ICS) Nomogram;

FIG. 4 depicts a representative nomogram part-and-parcel of performance of a non-invasive PFS (e.g., UroCuff Test), namely, a Newcastle Noninvasive Nomogram;

FIG. 5 schematically represents an advantageous, non-limiting urodynamic system (UDS) for deriving a PFS symptom score to augment findings associated with a PFS, measured or measurable inputs and obtainable parameters therefrom for a derivation of correlated or associated PFS score sub-scores generally indicated;

FIG. 6 schematically represents processes attendant to FIG. 5 parameters for the derivation of parameter sub-scores associated therewith, select sub-scores contributing to the derivation or fabrication of one or more contemplated PFS symptom scores;

FIG. 7 represents an advantageous, non-limiting rubric or protocol for the derivation or fabrication of a first contemplated component value of a post void residual (PVR) score;

FIG. 8 represents an advantageous, non-limiting rubric or protocol for the derivation or fabrication of a second contemplated component value of the PVR score;

FIG. 9 represents an advantageous, non-limiting rubric or protocol for the derivation or fabrication of a voided urine volume (VV) score;

FIG. 10 represents an advantageous, non-limiting rubric or protocol for the derivation or fabrication of a first contemplated component value of a flow pattern (FP) score;

FIG. 11 represents an advantageous, non-limiting rubric or protocol for the derivation or fabrication of a second contemplated component value of the FP Score, with FIG. 11A illustrating focal periods for instant parameter component;

FIG. 12 represents an advantageous, non-limiting rubric or protocol for the derivation or fabrication of a third contemplated component value of the FP score;

FIG. 13 represents an advantageous, non-limiting rubric or protocol for the derivation or fabrication of a fourth contemplated component value of the FP score;

FIG. 14 represents an advantageous, non-limiting rubric or protocol for the derivation or fabrication of a first contemplated component value of a pressure profile (PP) score;

FIG. 15 represents an advantageous, non-limiting rubric or protocol for the derivation or fabrication of a second contemplated component value of the PP score;

FIG. 16 represents an advantageous, non-limiting rubric or protocol for the derivation or fabrication of a first contemplated component value of an abdominal straining (AS) score;

FIG. 17 represents an advantageous, non-limiting rubric or protocol for the derivation or fabrication of a second contemplated component value of the AS score;

FIGS. 18 & 19 represent illustrative augmented UroCuff Test outputs of the FIG. 5 UDS, namely, a Newcastle Noninvasive Nomogram (FIG. 18) and PFS Score with supporting graphic schematic component sub-scores (FIG. 19) for UroCuff Test subject "X"; and, FIGS. 20 & 21 represent illustrative augmented UroCuff Test outputs as FIGS. 18 & 19 for UroCuff Test subject "Y."

DETAILED DESCRIPTION OF THE INVENTION

A novel symptom score/scoring system attendant to PFS and augmenting the findings thereof (i.e., obstructed, unobstructed, other) is generally provided. While the PFS may be of the catheterized or non-invasive type, illustrative non-limiting emphasize in this description is directed to the latter PFS type, more particularly still, to that part-and-parcel of the UroCuff Test available from SRS Medical Systems, Inc., Massachusetts, USA.

The PFS score is notionally an aggregate of symptom sub-scores, more particularly, the PFS score is characterized by a select weighted average composite of symptom sub-scores, or select symptom sub-scores. The symptom sub-scores in turn are reflective of parameters derivable from measured of measurable PFS inputs. Consideration of up to six derived or synthesized sub-scores are contemplated, namely, those directed to flow rate efficiency (FRE), post void residual (PVR), voided volume (VV), flow pattern (FP), pressure pattern (PP), and abdominal strain/straining (AS).

Moreover, a symptom score synthesis method or derivation methodology, underlying the symptom score architecture and/or fabrication, is contemplated and herein after taken up. Notionally, the methodology necessarily takes up the derivation of the contemplated sub-scores, and the PFS score per se premised upon at least select sub-scores of the contemplated sub-scores. Finally, a urodynamic system for deriving the symptom score and/or practising the method is likewise contemplated and later taken up.

As a threshold matter, and in advance of particulars, it is believed advantageous to provide a further overview of the instant disclosure, a road map. Having established context for Applicant's work in the background section, with specific citation to each of FIGS. 1-4 therein, the instant disclosure commences with presentation of an illustrative urodynamic system (FIG. 5) wherein measured or measurable inputs and obtainable parameters relating thereto are taken up, followed by an overview of processes attendant to contemplated parameters for the derivation of parameter sub-scores which contribute to fabrication of the PFS Score (FIG. 6). Thereafter, rubrics underlying PFS Score sub-score derivations are taken up (FIGS. 7-17), with the instant disclosure concluding with a compare/contrast illustration of PFS test (UroCuff Test) subjects X & Y evidencing the value of the contemplated approach to augmenting the findings of a PFS.

Figure 1:
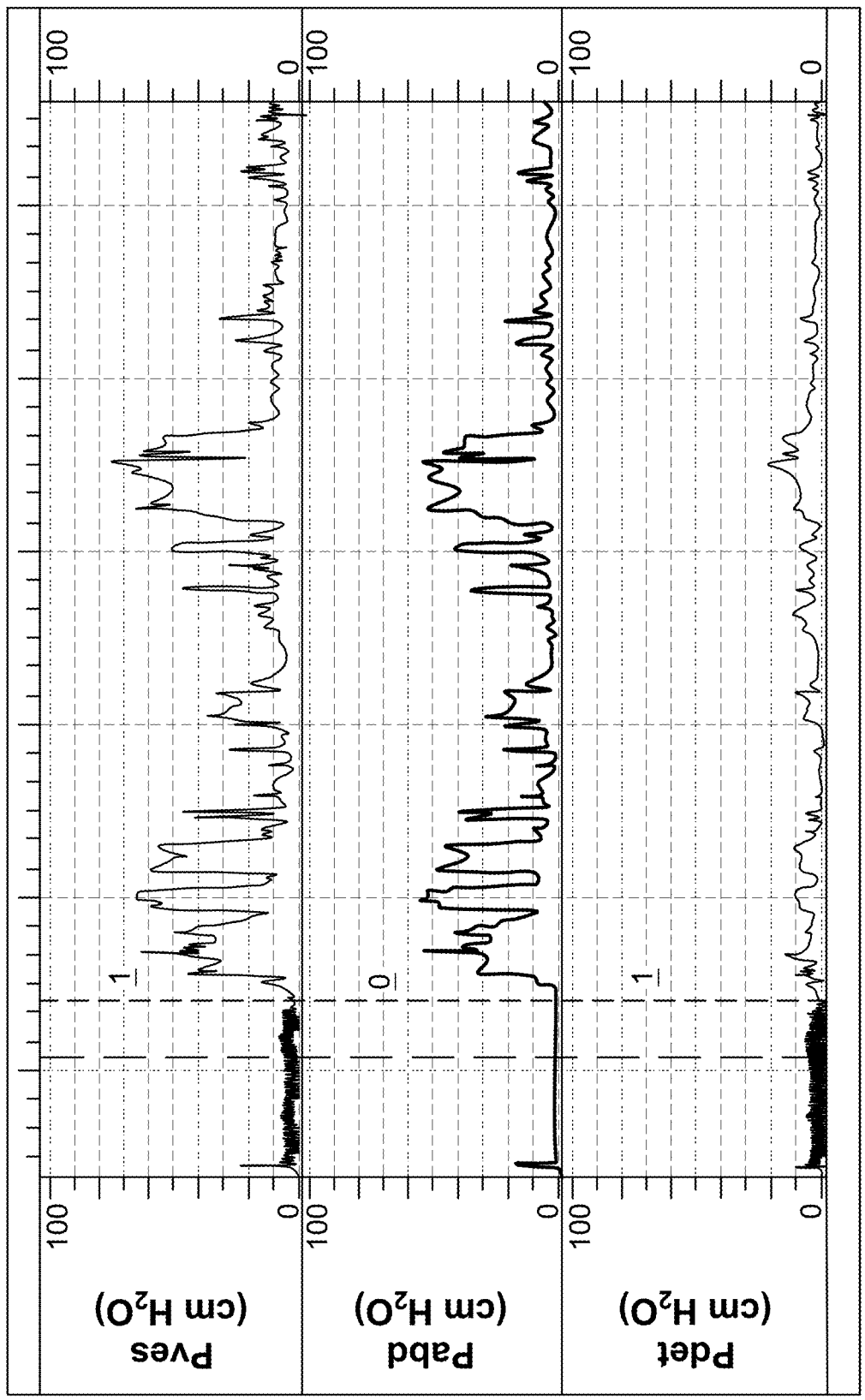
Figure 2:
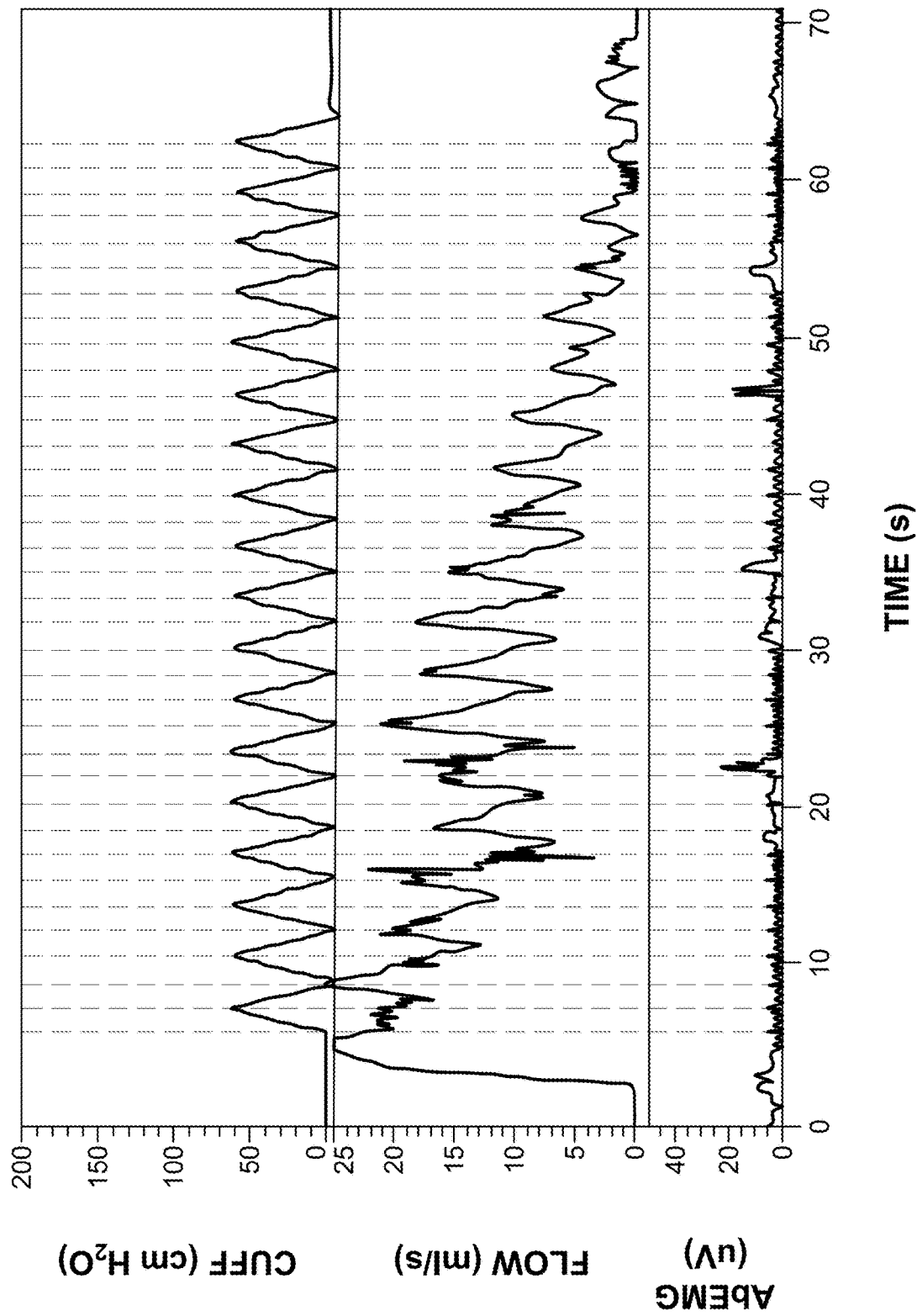
Figure 3:
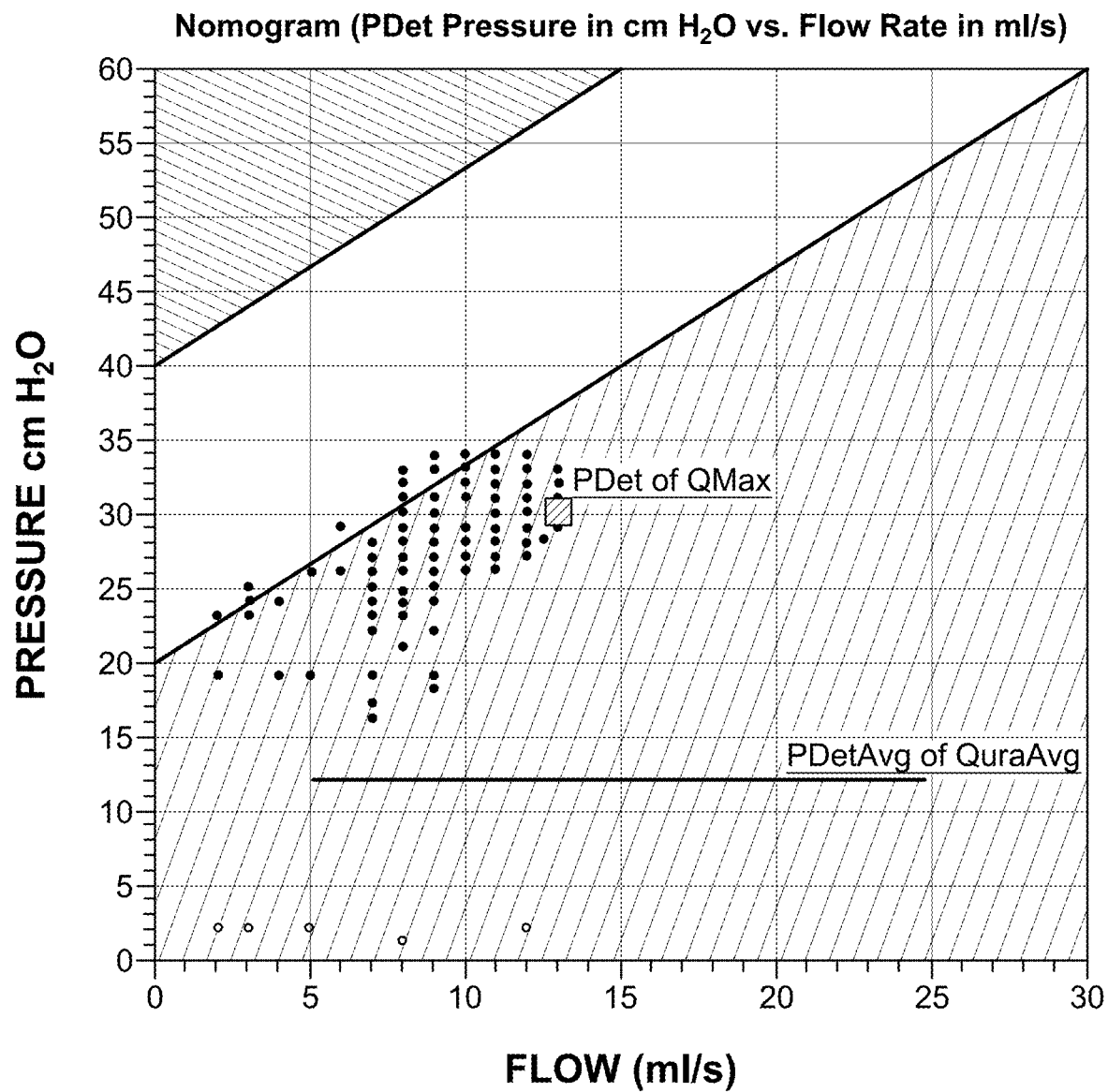
Figure 4:
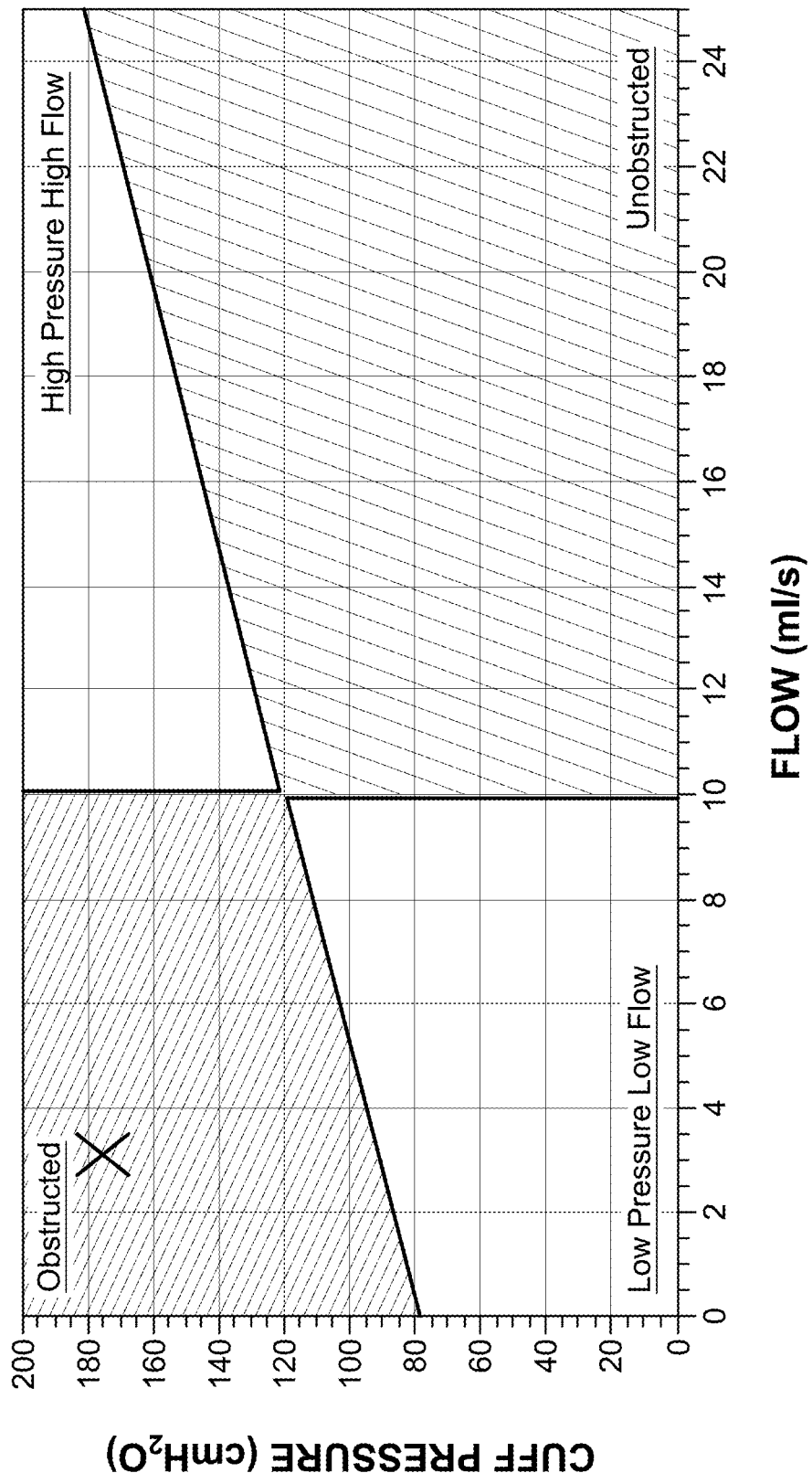
Figure 5:
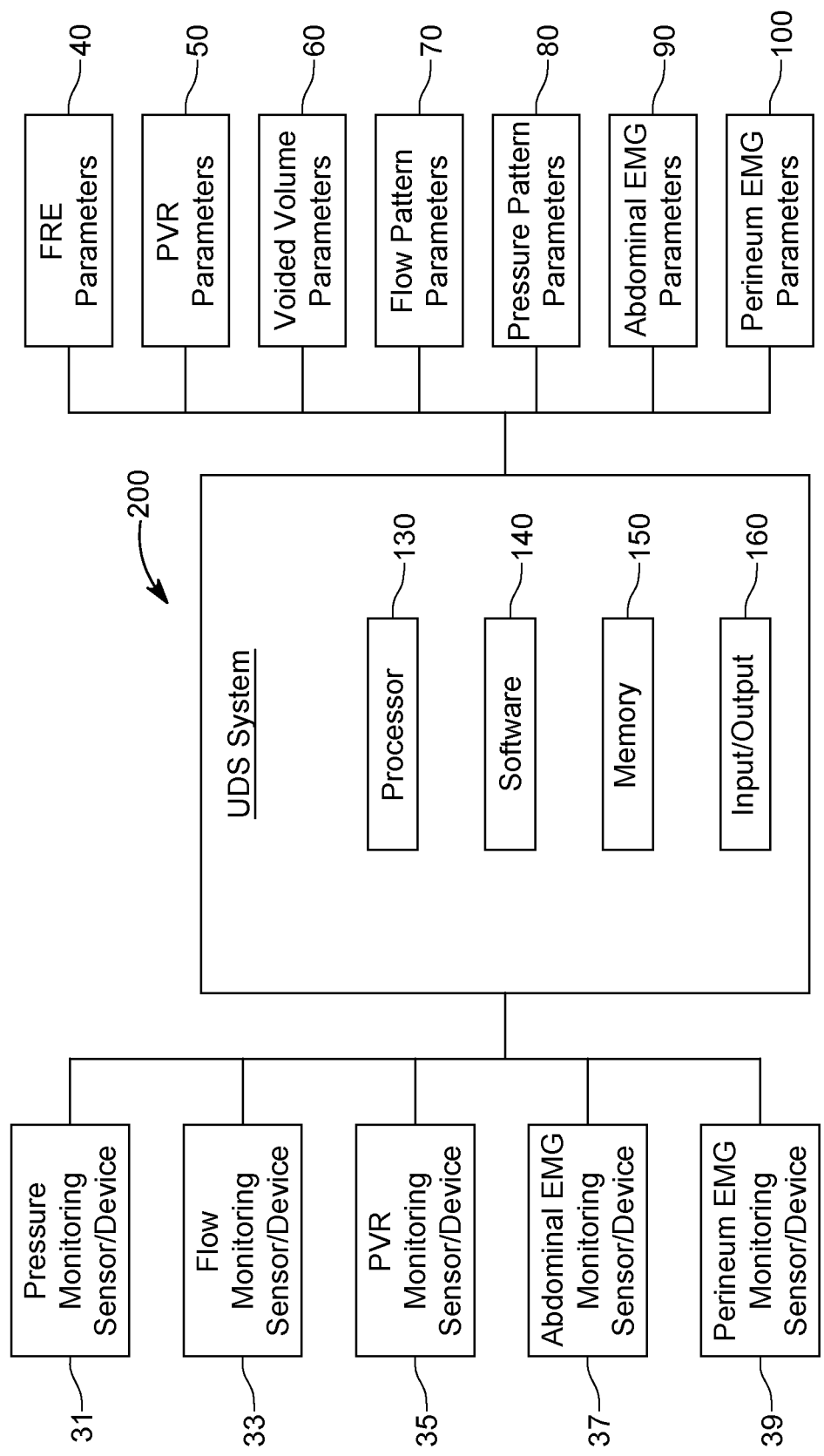
Figure 6:
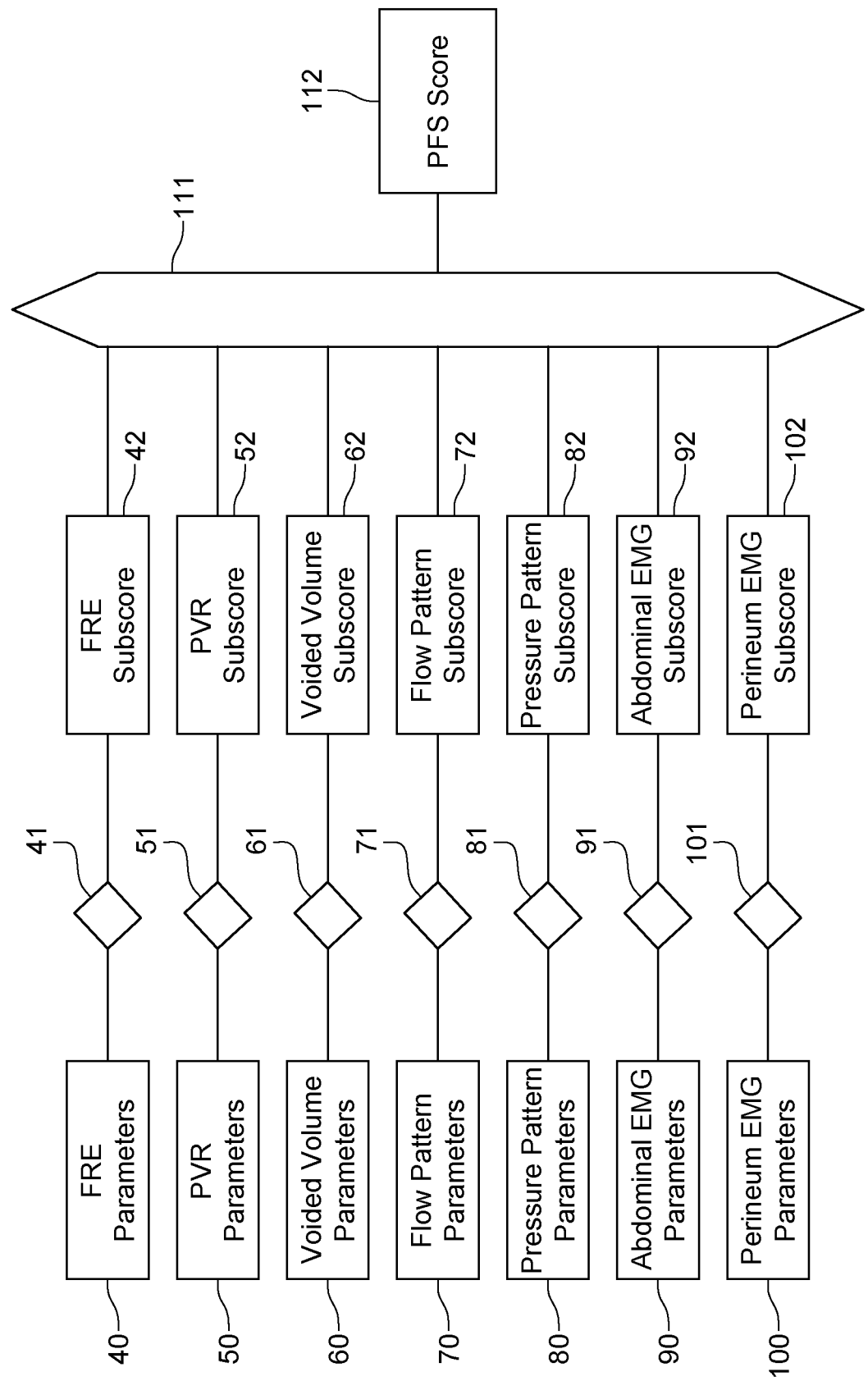

With initial reference to FIG. 5, a non-limiting urodynamic system (UDS) 200 for deriving a PFS symptom score to augment findings associated with a PFS is schematically and/or functionally shown. Elements of the system advantageously include, but are not limited to a processor 130, system score derivation module 140, advantageously in the form of software for deriving and/or fabricating contemplated parameters, parameter components, sub-scores and the PFS score per se, memory 150, and input/output devices 160. The referenced UDS elements are operatively linked in known ways to effectuate sought after system processing and overall functionality.

Contemplated PFS data collection is effectuated via utilization of a variety of sensing, sensing/monitoring devices (or apparatus as the case may be), figure left, 31, 33, 35, 37, & 39, in relation to correlated inputs advantageously comprised of pressure, urine flow, post void residual (PVR), abdominal strain, and/or perineum activity respectively. Via concerted select operative engagement of at least select elements of the UDS, advantageous parameters having origins in each of the inputs, figure right 40, 50, 60, 70, 80, 90 & 100, are derived or otherwise ascertained, namely, flow rate efficiency (FRE), post void residual (PVR), voided urine volume (VV), flow profile (FP), pressure profile (PP), abdominal strain (AS), and perineum activity (PA) respectively.

With reference now to FIG. 6, processes attendant to FIG. 5 parameters for the derivation of parameter sub-scores associated therewith are schematically represented, 41, 51, 61, 71, 81, 91, & 101, for each of the parameters 40, 50, 60, 70, 80, 90 & 100, More particularly, the cited processes are characterized by rubrics or protocols, executable in connection to system score derivation module 60, the rubrics subsequently taken up in connection to each of the noted parameters.

PFS Score processing 111 is undertaken so as to yield PFS Score 112. As to PFS Score fabrication, an advantageous, non-limiting rubric 111 underlies same, namely:

$$PFS\ Score = \frac{(3^*FRE\ Score) + (3^*PVR\ Score) + (3^*Voided\ Volume\ Score) + (2^*Flow\ Pattern\ Score) + (2^*Pressure\ Pattern\ Score) + (1^*Abdominal\ Straining\ Score)}{(3+3+3+2+2+1)}$$

It is to be further noted and appreciated that underlying the instant augmented PFS diagnostic is the notion of a compelling desire to void (CDV). All voiding related parameters are influenced by CDV. Notionally, a full PFS score is predicated upon a maximum rating of CDV. To the extent that CDV is less than optimal, not all sub-scores will be considered, commonly, the FRE subscore will be used as a proxy for the PFS score. PFS Score components are herein after sequentially taken up.

A flow rate efficiency (FRE) score 42, what is believed to be a primary PFS score sub-score, has been developed. FRE per se is a calculated value, a ratio of maximum flow to maximum pressure. The FRE Score value is a scaled value, 0-100, with unobstructed patients having/receiving "high" scores and obstructed patients having/receiving "low" scores. As to FRE Score fabrication, an advantageous non-limiting rubric 41 underlies same, namely:
  if maximum pressure is ≤60 cm H2O, then the FRE Score is "indeterminate";
  if the ration of maximum flow to maximum pressure ($Q_{MAX}$ [ml/s]/$P_{MAX}$ [cmH2O])>0.25, then the FRE Score is 100; else,
  FRE Score=($Q_{MAX}$[ml/s]/$P_{MAX}$[cmH2O]).

A post void residual (PVR) score 52, what is believed to be a further primary PFS score sub-score, has likewise been developed. As to PVR Score fabrication, an advantageous non-limiting rubric 51 corresponding to the tables of FIGS. 7 & 8 underlies same, particulars to follow. The PVR Score is a reflection of the patient's PVR, optionally measured directly following a PFS study. PVR is the amount or quantity of urine remaining in the bladder following a void, typically but not necessarily measured using an ultrasound, the volume measurement returned is in ml.

The contemplated PVR Score advantageously includes two factors or components, namely a PVR value component (score) and a PVR bladder capacity value component (score). Each factor or component is sequentially taken up herein after.

In connection to the first PVR Score factor or component, the PVR value component is premised directly upon PVR, i.e., the urine volume (mls) remaining in the bladder post void. For example, and in keeping with FIG. 7 of rubric 51, a PVR of <50 ml results in a PVR value component of 1 (100%), a PVR of 150 ml resulting in a PVR value component of 0.4 (40%).

In connection to the second PVR Score factor or component, the PVR bladder capacity value component of the PVR Score is a based upon the percentage of urine remaining in the bladder as compared to the total amount of urine that was in the bladder at the start of the void (i.e., PVR as a percentage of bladder capacity (BC), PVR % BC). For example, and in keeping with FIG. 8 of rubric 51, a PVR % BC component score of 0.4 (40%) results/correlates for a patient having a PVR of 100 ml and a voided volume (VV) of 100 ml, with a PVR % BC sub-score of 0.9 (90%) for a patient having a PVR of 100 ml and a VV of 400 ml.

Having established and set forth the PVR Score components or factors, PVR Score 52 is advantageously defined as a weighted average of the PVR value component and the PVR % BC value component, more particularly, and without limitation:

$$Post\ Void\ Residual\ Score = .7^*PVR\ Value\ sub-score + .3^*PVR\%BC\ sub-score$$

To the extent that no PVR is of record/is recorded, this parameter is not factored into the PFS Score aggregation.

A voided volume (VV) score 62, what is believed to be a yet further primary PFS score sub-score, has likewise been developed. As to VV Score fabrication, an advantageous non-limiting rubric 61 corresponding to the table of FIG. 9 underlies same, particulars to follow. The VV Score is a reflection of the patient's VV measured during a PFS Study. VV is the measured amount or quantity of urine voided during the PFS study, input as a volume, more particular, in ml. Commonly, a scale is utilized for a collected urine mass determination in the context of a flow meter commode or the like, with conversion to volume via known relationships between mass and volume, or, contrariwise, collected urine may be volumetrically measured via a graduated cylinder/flask or the like. For example, and in keeping with the FIG. 9 rubric, VV Score 62 for a patient having a VV of 300 ml is 1 (100%), with a VV of 100 ml correlating to a VV Score of 0.25 (25%).

A flow pattern (FP) score 72, what is believed to be a secondary PFS subscore, has been developed. As to FP Score fabrication, an advantageous non-limiting rubric 71 corresponding to the tables of FIGS. 10-13 underlies same, particulars to follow. The FP Score is a reflection of the patient's urine flow measured during a PFS Study. FP is the rate at which urine is voided, measured during the PFS typically by continuously weighing the urine, with the measurement units in ml/s.

The contemplated FP Score advantageously includes four factors or components, namely, a void time value component, a hesitancy value component, a time to peak value component, and a peak flow rate value component. While advantageous, it is believed that further and/or alternate FP Score parameters relating to or for the assessment/improved consideration of the smoothness and/or continuity of the urine flow pattern may be obtainable. That said, each contemplated factor or component is sequentially taken up herein after.

In connection to the first FP factor or component, the void time value component is premised upon void time duration. Void time is the time, in seconds, from the commencement of urine flow corresponding to the beginning of the void until the cessation of flow delimiting the end of the void. As a practical matter, and in the context of the UroCuff Test, assumptions in connection to void time are advantageously but not necessarily made for the sake of consistency/continuity, namely, assumptions related to applied pressure, e.g., the "start" of urine flow is "set" to 2 s before the initial pressure application, even if there is inconsistent urine flow prior to that, and the "end" of urine flow, i.e., end of the void, delimited by the relative cessation of detected or recordable data associated with the void, e.g., temporal (i.e., 8 s), or volume (i.e., 4 ml) limit so as to effectively ignore any/all post-void dribbles). For example, and in keeping with FIG. 10 of rubric 71, a measured or ascertained void time of 25 s results in a void time value component value of 1 (100%), a void time of 50 s results in void time value component value of 0.4 (40%).

In connection to the second FP factor or component, hesitancy is a reflection of urine flow cessation, i.e., an interruption, during a void. Hesitancy is the duration, in seconds, corresponding to a no-flow condition during the void event (i.e., void time). Again, contextually in the UroCuff Test, the hesitancy "window" is from the initiation of applied pressure to the cessation of applied pressure. It is to be noted that while pressure application (i.e., changes in applied pressure) is known to, and in fact may cause interruptions in urine discharge flow, such "hesitation(s)" is/are excluded from this factor value determination.

With reference to FIG. 11a, the focal periods for this parameter (i.e., component) are during a transition from full cycle to half cycle pressure applications A, between sequential half cycle pressure applications B, and instances of flow re-start C. The hesitancy between full cycle-half cycle and between half cycles should be the time between those cycles minus 2 seconds. For example, and in keeping with FIG. 11 of rubric 71, no hesitancy yields a maximum value 1 (100%), a hesitancy of 5 s or greater yields a zero component value, with a linear relationship defining the hesitancy value component value therebetween, a 2 s hesitancy yielding a hesitancy value component value of 0.6 (60%).

In connection to the third FP factor or component, time to peak is notionally directed to the point in time during the void wherein peak urine discharge flow is achieved. For present purposes, it is believed advantageous, but not necessary, to delimit the parameter as percentage of void time that it takes to achieve peak urine discharge flow.

Having determined/assigned a value to void time which starts two seconds before the initial pressure application in the UroCuff Test context, the time from that starting point to the occurrence of peak flow is ascertained. By way of illustration, with a 30 s void time and a peak flow occurring 3 s into the void, the associated or resulting contemplated time to peak parameter is 3/30 or 10%, i.e., peak flow is "early" in the void, 10% into the void time/duration.

As to the "time" associated with time to peak urine discharge flow, Qmax, as reported in the nomogram, is the basis of time determination, the starting point. For the sake of internal consistency and/or continuity, flow peaks occurring in the two seconds before the first pressure application are discounted/ignored (i.e., Max1 is set as the flow value just before the first pressure application).

For this time to peak parameter only, it is believed advantageous to review urine discharge flow rates up to two seconds prior to the first pressure application to ascertain the occurrence of a "peak" flow rate in excess of Qmax (i.e., Max 1>Qmax). In lieu of such occurrence or relationship, "time" to peak is that associated with Qmax. Should there exist a peak flow rate greater than Qmax occurring in the 2 seconds preceding to the start of the first pressure application, the time that this peak occurs (i.e., Max1) is used to calculate time to peak as a percentage of void duration. Notionally, it is believed that a peak occurring prior to the first/initial pressure application for pressure-flow calculations is in a relative sense immaterial, in connection to the time to peak parameter contemplated, it is believed an advantageous consideration.

For example, and in keeping with FIG. 12 of rubric 71, a time to peak as a percentage of void time value of 15% yields a time to peak value component value of 1 (100%).

Moreover, a time to peak as a percentage of void time value of 50% yields a time to peak value component value of 0.4 (40%).

In connection to the fourth FP factor or component, the flow rate value component correlates with/to Qmax, as reported in the nomogram. As has been taken up in connection to the third FP parameter or component construct, while there may exist a Max 1>Qmax, the value of the flow rate value component is premised upon Qmax, measured in ml/s. For example, and in keeping with FIG. 13 of rubric 71, a peak flow rate of 15 ml/s yields a flow rate value component value of 1 (100%). A peak flow rate of 5 ml/s yields a flow rate value component value of 0.3 (30%).

Having established FP Score parameters, namely, void time, hesitancy, time to peak, and peak flow, FP Score 72 comprises a weighted aggregate of the parameters thereof, more particularly and advantageously:

$$\text{Flow Pattern Score} = 0.25^*(VoidTime - ss) + $$
$$0.25^*(\text{Hesitancy} - ss) + 0.25^*(TimePeak - ss) + 0.25^*(PeakFlow - ss)$$

A pressure pattern (PP) score 82, what is believed to be a secondary PFS subscore, has been developed. As to PP Score fabrication, rubric 81 corresponding to the tables of FIGS. 14 & 15 is utilized and believed advantageous. The PP Score has its origins in pressures measured and recorded, in $cmH_2O$, during the PFS. The PP Score is intended to reflect the patient's vesical or detrusor pressure measured during a PFS Study. Notionally, pressure pattern speaks to the shape of the pressure curve associated with the void of the PFS, the character of that relationship, e.g., the relative "smoothness" of the curve, the pressure profile formed to push or expel the urine out of the body.

The contemplated PP Score advantageously includes two factors or components, namely, a pressure-flow match value component, and a peak pressure value component. Each component is sequentially taken up herein after.

In connection to the first PP factor or component, the pressure-flow match value component is intended to be an expression of the consistency of the proportional relationship between applied pressure and urine discharge flow. This value component, more particularly, rubric 81 component for same (FIG. 14), is a consideration to the extent three or more valid applied pressure values are available, if not, a pressure-flow match value component value is set to 0.4.

Based upon an assessment of pressure-flow relationships throughout all uninterrupted full cycle data sets considered/available to Applicant (e.g., those associated with, among others, the work of Kaplan, Kohler & Kausik cited supra), it is believed beneficial and advantageous to ascertain average FRE, the ratio of the FRE standard deviation (STDV) to average FRE (i.e., normalized variation of the individual FREs; the lower the value, the more tightly grouped are the individual FREs), and the ratio of Qmax to average FRE (i.e., what the pressure should be at the maximum flow rate). In the context of the pressure-flow match value component, STDV/AverageFRE is relied upon.

With regard to the contemplated FRE ratios, their determination is predicated upon the relationship between "zero-flow-Pves" and either "second-adjusted-flow" (measured) or "calcminmax" (extrapolated) flow values. For min-type pressure cycles, calcminmax values are utilized, and for max-type cycles, second-adjusted-flow values are utilized. Generally, full cycles are an exclusive focus, including full cycles that follow half cycles. Full cycle tabulated entries having second-adjusted-flow values of zero, and the two tabulated data rows thereafter are ignored. The ignored rows are eliminated from consideration owing to potential surges and ambiguities attended to record parameter values, the first of the two rows perhaps including the surge itself, the second of the two perhaps influencing the project flow rate value as it use the surge peak in the projection calculation (i.e., calcminmax values). Finally, outliers as to pressure and flow are likewise ignored in relation to the pressure-flow match value component derivation.

For this value component of PP Score, for example, and in keeping with FIG. 14 of rubric 81, a ratio value of <1 for FRE standard deviation to average FRE yields a pressure-flow match value component value of 1 (100%). A ratio value of 0.35 yields a pressure-flow match value component value of 0.55 (55%).

In connection to the second PP factor or component, the peak pressure value component is premised upon the peak measured pressure, cmH$_2$O, obtained in the course pf performing the PFS. For example, and in keeping with FIG. 15 of rubric 81, a peak pressure of 90 cmH$_2$O yields a peak pressure value component value of 1 (100%), a peak pressure of 40 cmH$_2$O yields a peak pressure value component value of 0.25 (25%).

Having established PP Score parameters, namely, both of a pressure-flow match value component, and a peak pressure value component, PP Score 82 comprises a weighted aggregate of the parameters thereof, more particularly and advantageously:

$$\text{Pressure Pattern Score} = 0.35*(\text{PresFlowMatch-}ss) + 0.65*(\text{Peak Pressure-}ss)$$

An abdominal straining (AS) score 92, what is believed to be a tertiary and optional PFS subscore, has likewise been developed. As to AS Score fabrication, rubric 101 corresponding to the tables of FIGS. 16 & 17 is utilized and believed advantageous. The AS Score is a reflection of the amount of abdominal straining that the patient undergoes during the PFS.

Abdominal straining is assessed via use of and abdominal catheter during a catheterized PFS, and is assessed using abdominal electromyography (EMG) during a non-invasive PFS. Notionally, the goal is for the patient to avoid independent of the creation of not insubstantial abdominal pressure by "bearing down" to initiate the void and/or during the void, thus, the absence/relative absence of abdominal strain detection will result in a "high" Abdominal Straining Score (approximately 100%), with detected straining resulting in suboptimal scoring.

For non-invasive PFS when abdominal EMG is recorded immediately before and during the PFS, there is an option to perform a "simulated strain" following the void to better scale or better interpret the abdominal EMG activity. This is believed advantageous because the EMG (measured in uV) does not have a universal scale that easily converts to Pabd (measured in cmH$_2$O). By comparing abdominal EMG collected during the PFS to abdominal EMG collected during a simulated strain, AS scoring can be optimized.

In connection to this optional PFS assessment, maximum and minimum abdominal EMG values are ascertained in connection to the UroCuff Test. Moreover, a mean EMG value is ascertained. Suitable values are securing during the void, the maximum and mean values secured from the time of initial applied pressure to end of the last applied pressure. The minimum value detection window is commensurate with the full study period, including before the first pressure application to and through the end of the last pressure application.

The contemplated AS Score advantageously includes two factors or components, namely, a MaxMin value component, and a MeanMin value component. Each component is sequentially taken up herein after.

In connection to the first AS score factor or component, the MaxMin value component is predicated upon the difference between the maximum and minimum abdominal EMGs detected. For example, and in keeping with FIG. 16 of rubric 101, a max/min differential of <2 yields a MaxMin value component value of 1 (100%), a max/min differential of 8 yields a MaxMin value component value of 0.5 (50%).

In connection to the second AS score factor or component, the MeanMin value component is predicated upon the difference between the mean and minimum abdominal EMGs values. For example, and in keeping with FIG. 17 of rubric 101, a mean/min differential of <1 yields a MeanMin value component value of 1 (100%), a mean/min differential of 8 yields a MaxMin value component value of 0.35 (35%).

Having established AS Score parameters, namely, both of a maximum/minimum abdominal EMG differential value component, and a mean/minimum abdominal EMG differential value component, AS Score 102 comprises a weighted aggregate of the parameters thereof, more particularly and advantageously:

$$\text{Abdominal Straining Score} = 0.65*(\text{MaxMin}-ss) + 0.35*(\text{MeanMin}-ss)$$

Figure 18:
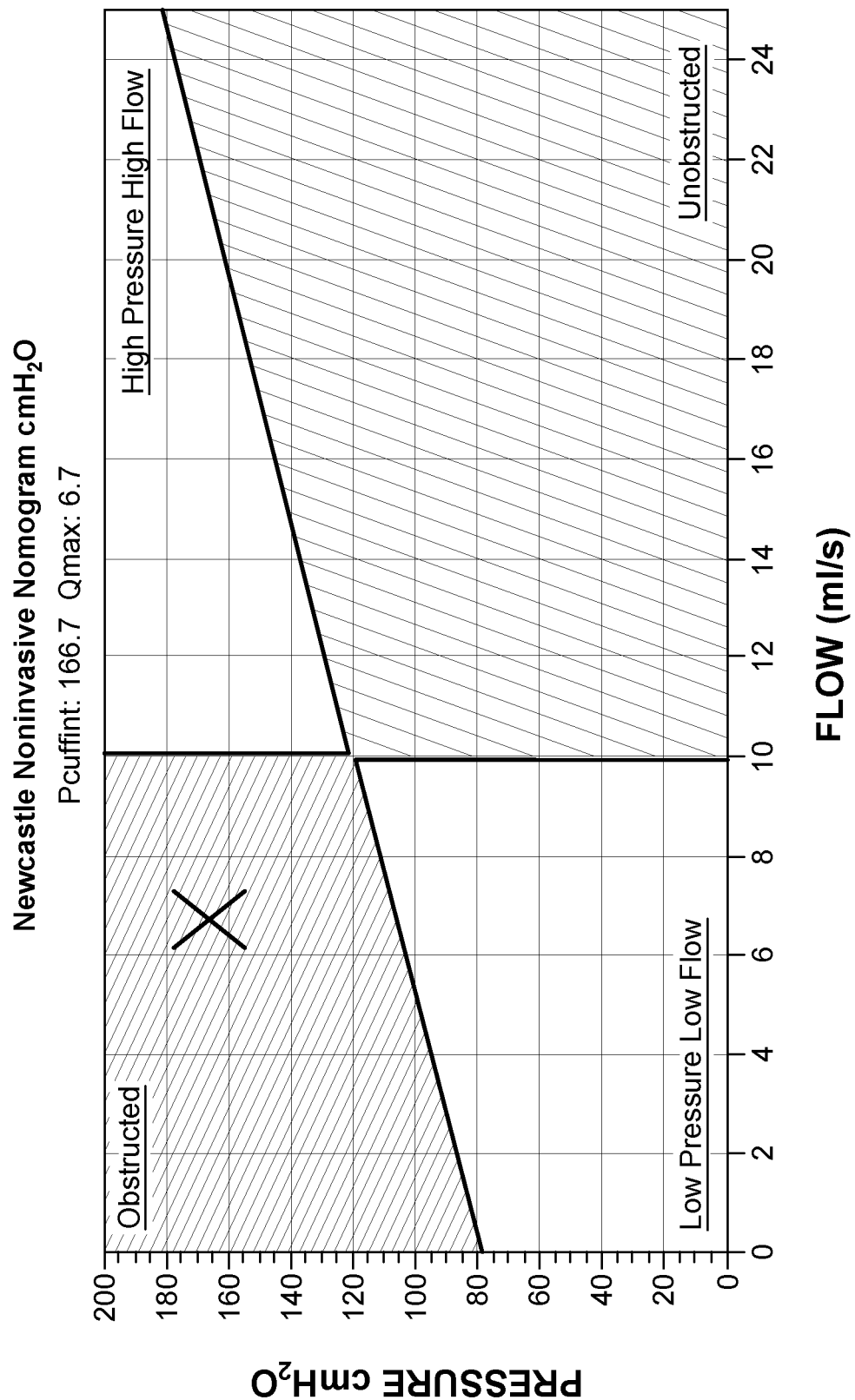

In light of having set forth particulars for the contemplated PFS Score paradigm, a working example of the augmented PFS findings conclude this disclosure. With reference now to FIGS. 18/19 on one hand and FIGS. 20/21 on the other, diagnostic tools are represented in relation to UroCuff Test subject X and Y respectively.

Figure 19:
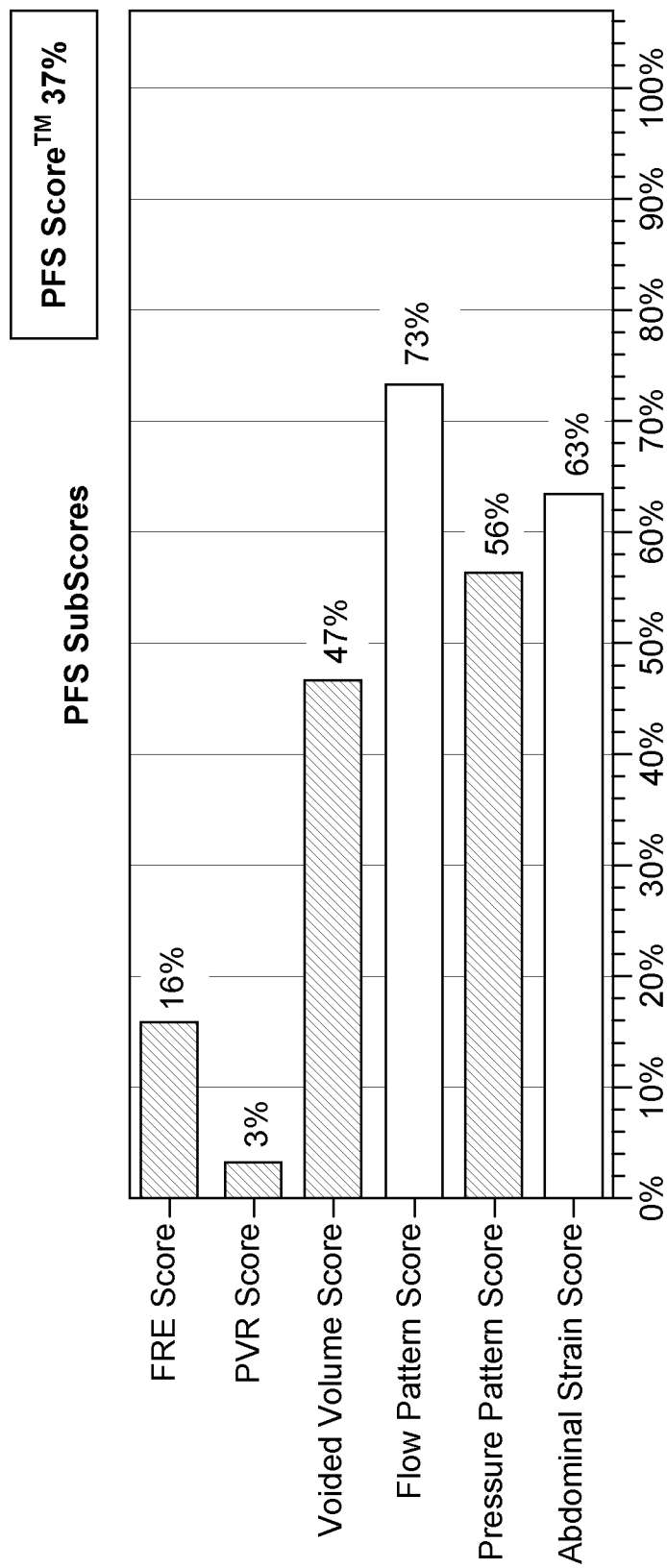
Figure 20:
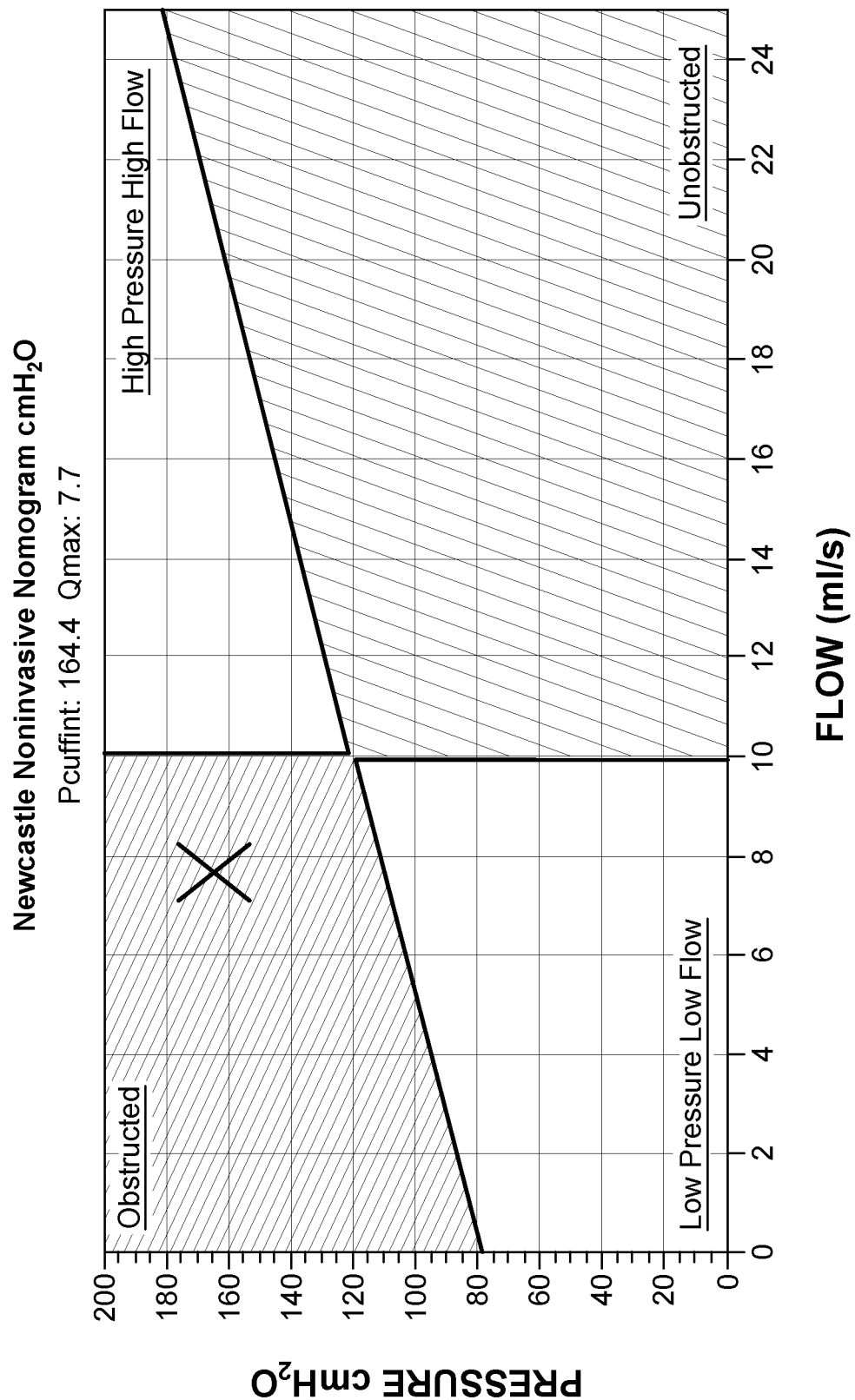
Figure 21:
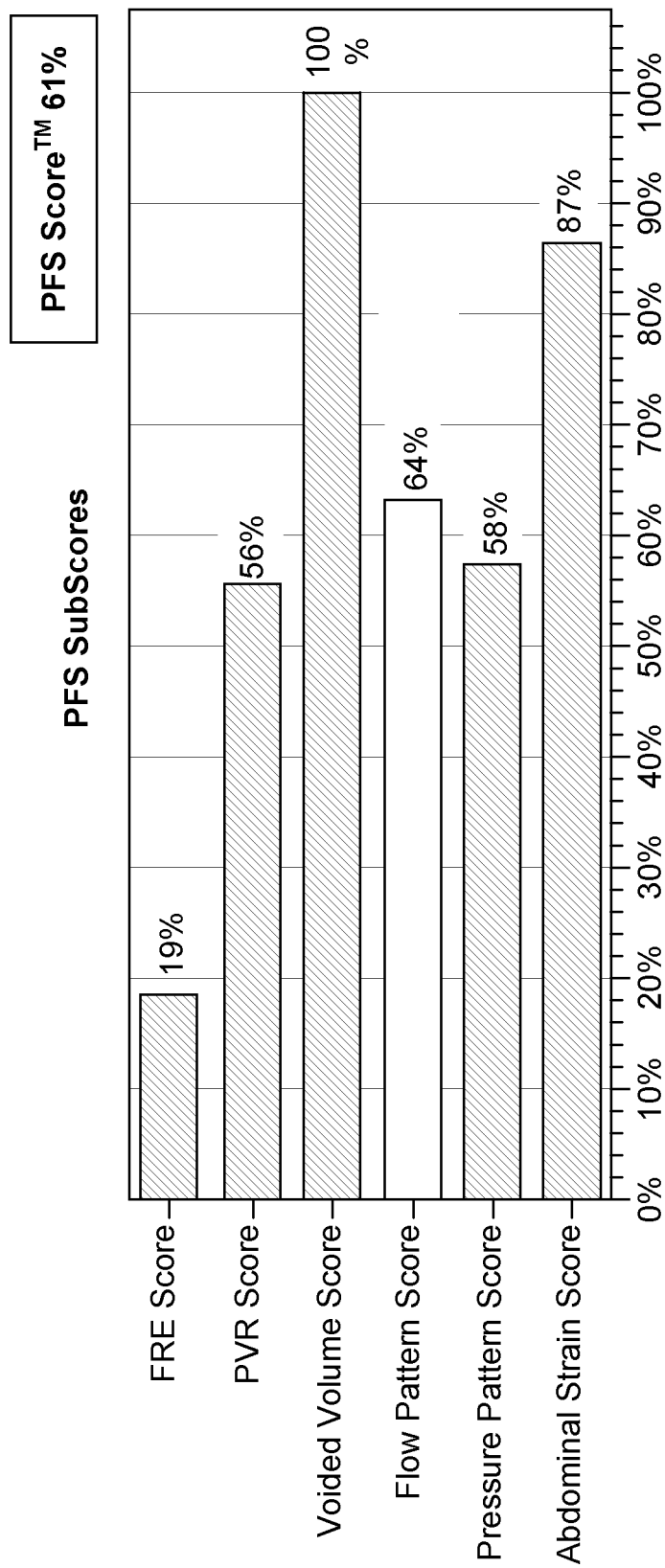

Newcastle Noninvasive Nomograms are provided FIGS. 18 & 20. Based on this standard metric, subjects X & Y appear similar situated relative to this diagnostic. Each subject presents as obstructed. However, with reference to the supplemental, augmented PFS Score and related indicia (i.e., sub-scores) set forth FIGS. 19 & 21, it is clear that the circumstances of the subjects are not congruous, and as such, the management plans for each of these subject may be uniquely tailored to fit the circumstances of each of the subjects.

What has been described and depicted herein are preferred, non-limiting embodiments of Applicant's subject matter, along with application contexts as the case may be. Since the elements of the methodology and/or system disclosed herein may be embodied in other specific forms without departing from the spirit or general characteristics thereof, some of which forms have been indicated, the embodiments described and depicted herein/with are to be considered in all respects illustrative and not restrictive. Moreover, while nominal operational steps or sequences and/or rubrics/protocols have been set forth, contemplated sequences/protocols are not so limited. Accordingly, the scope of the subject invention is as defined in the language of the appended claims, and includes not insubstantial equivalents thereto.

That which is claimed:

1. A method of assessing pressure flow study data for lower urinary tract symptom determination wherein voiding pressure and resulting urine flow rate determinations are obtained during a void event using a urodynamic system characterized by, in operative combination, a processor, memory and symptom score software executable by the processor, the urodynamic system receiving input from at least pressure and urine flow sensing devices in furtherance of ascertaining a maximum urine discharge flow rate, a maximum vesical pressure value, and a total volume of voided urine, comprising the steps of:

a. deriving a first primary symptom sub-score comprised of a flow rate efficiency symptom sub-score predicted upon a maximum vesical pressure value sensed via the pressure sensing device and upon a maximum urine discharge flow rate determined via the urine flow sensing device, or derivable from collected voided volume urine quantity as a function of time during a void event;

b. deriving a second primary symptom sub-score comprised of a post void residual symptom sub-score predicted upon a relationship between a measured voided volume of urine and a measured or sensed residual volume of urine remaining in a bladder post void;

c. deriving a third primary symptom sub-score comprised of a voided volume sub-score predicated upon the measured voided volume of urine;

d. deriving a first secondary symptom sub-score comprised of a flow pattern symptom sub-score predicated upon a relationship for, between and/or among a measured urine void time value, a derived hesitancy value based upon a sensing of one or more no flow conditions during a urine void event, a time to peak measured urine discharge flow, and the maximum urine discharge flow rate;

e. deriving a second secondary symptom sub-score comprised of a pressure pattern sub-score predicated flow rate efficiency and measured maximum pressure; and, f. selectively combining select symptom sub-scores to obtain a symptom score comprising a select weighted average composite of select symptom sub-scores.

2. The method of claim 1 wherein the selective combining of select symptom sub-scores emphasizes either of the flow rate efficiency symptom sub-score or the voided urine volume symptom sub-score.

3. The method of claim 1 wherein the selective combining of select symptom sub-scores emphasizes both of the flow rate efficiency symptom sub-score and the voided urine volume symptom sub-score.

4. The method of claim 1 wherein the selective combining of select symptom sub-scores comprises a hierarchical weighting of select symptom sub-scores to yield the select weighted average composite.

5. The method of claim 1 wherein components of the pressure pattern sub-score comprise each of a shape of a curve associated with a plot of applied pressure as a function of time, a consistency of a proportional relationship between applied pressure and urine discharge flow rate, and maximum applied pressure.

6. The method of claim 1 further comprising deriving an abdominal straining sub-score.

7. The method of claim 1 further comprising deriving an abdominal straining sub-score, said abdominal straining sub-score reflective of plural components.

8. The method of claim 1 further comprising deriving an abdominal straining sub-score, said abdominal straining sub-score reflective of plural components, the plural components comprising abdominal electromyography values obtained during pressure flow study performance and abdominal electromyography values obtained during performance of a simulated strain protocol.

9. A urodynamic system for deriving a symptom score to augment findings associated with a pressure flow study for lower urinary tract symptom determination, the system comprising:

a. a processor for processing select urodynamic patient parameter inputs;

b. a database accessible by said processor;

c. a user interface device operably linked to said processor in furtherance of supporting processor control and/or display of patient parameter inputs/select processed urodynamic patient parameter inputs;

d. a pressure sensor for sensing vesical pressure during bladder filling and/or emptying, said select urodynamic patient parameter inputs characterized by pressure values obtained via said pressure sensor;

e. apparatus for deriving urine flow rate, said select urodynamic patient parameter inputs characterized by urine flow rate obtained via said apparatus for determining urine flow rate; and, f. a symptom score derivation module operably linked/linkable with said processor, said database and said user interface device, said symptom score derivation module executing steps of deriving select symptom sub-scores characterized by two or more of a flow rate efficiency symptom sub-score, a post void residual symptom sub-score, a voided urine volume symptom sub-score, a flow pattern symptom sub-score, and a pressure pattern symptom sub-score, said flow rate efficiency sub-score predicted upon a maximum vesical pressure value sensed via the pressure sensor and upon a maximum urine discharge flow rate determined via the apparatus for deriving urine flow rate, said post void residual symptom subs-score predicted upon a relationship between a measured voided volume of urine and a measured or sensed residual volume of urine remaining in a bladder post void, said voided volume symptom sub-score predicated upon the measured voided volume of urine, said flow pattern symptom sub-score predicated upon a relationship for, between and/or among a measured urine void time value, a derived hesitancy value based upon a sensing of one or more no flow conditions during a urine void event, a time to peak measured urine discharge flow, and the maximum urine discharge flow rate, and said pressure pattern symptom sub-score predicated flow rate efficiency and measured maximum pressure, the symptom score comprising a select weighted average composite of select symptom sub-scores.

* * * * *